United States Patent
Doolani et al.

(10) Patent No.: US 11,074,432 B2
(45) Date of Patent: Jul. 27, 2021

(54) SYSTEMS AND METHODS FOR RETRIEVING AND PRESENTING INFORMATION USING AUGMENTED REALITY

(71) Applicant: Nice Ltd., Ra'anana (IL)

(72) Inventors: Jayesh Doolani, Arlington, TX (US); Nicholas Duane Martin, McKinney, TX (US); Sathish Babu Adluru Subas, Frisco, TX (US)

(73) Assignee: NICE LTD., Ra'anana (IL)

( * ) Notice: Subject to any disclaimer, the term of this patent is extended or adjusted under 35 U.S.C. 154(b) by 82 days.

(21) Appl. No.: 16/547,669

(22) Filed: Aug. 22, 2019

(65) Prior Publication Data
US 2021/0056290 A1    Feb. 25, 2021

(51) Int. Cl.
*G06K 9/00*    (2006.01)
*G06K 7/14*    (2006.01)
*G06K 9/46*    (2006.01)

(52) U.S. Cl.
CPC ....... *G06K 9/00275* (2013.01); *G06K 7/1434* (2013.01); *G06K 9/00087* (2013.01); *G06K 9/00362* (2013.01); *G06K 9/4638* (2013.01)

(58) Field of Classification Search
CPC ............. G06K 9/00275; G06K 9/4638; G06K 9/00087; G06K 9/00362; G06K 7/1434
See application file for complete search history.

(56) References Cited

U.S. PATENT DOCUMENTS

| | | |
|---|---|---|
| 8,341,013 B2 | 12/2012 | Lee |
| 10,181,220 B2 | 1/2019 | Page et al. |
| 2004/0117638 A1* | 6/2004 | Monroe .......... G07C 9/38 713/186 |
| 2016/0217313 A1* | 7/2016 | Cuti ............ G06F 3/04842 |
| 2018/0349685 A1* | 12/2018 | Kolleri .......... G06Q 50/265 |
| 2019/0035153 A1* | 1/2019 | Dange .......... G06K 9/00228 |
| 2020/0045267 A1* | 2/2020 | Carey ............. G06T 7/20 |
| 2020/0242336 A1* | 7/2020 | Boic ............ G06K 9/00268 |
| 2020/0327347 A1* | 10/2020 | Arai ............ G06K 9/00892 |

FOREIGN PATENT DOCUMENTS

AU    2012227166 B2 *    5/2014    ............ G06K 9/621

OTHER PUBLICATIONS

Biometric Driven Initiative System for Passive Continuous Authentication (Year: 2011).*
A Facial Presence Monitoring System for Information Security (Year: 2009).*
A Personal Identity Annotation Overlay System using a Wearable Computer for Augmented Reality (Year: 2003).*
Real Time Face Recognition System (Year: 2016).*
Anthony K. Tjan, "The Challenge of the Average Employee"; Harvard Business Review Article, Oct. 4, 2011.

* cited by examiner

*Primary Examiner* — Nizar N Sivji
(74) *Attorney, Agent, or Firm* — Pearl Cohen Zedek Latzer Baratz LLP

(57) ABSTRACT

A system and method for recognizing a person, including: capturing an identifying feature of the person; identifying the person based on the identifying feature to return a person identity; using the person's identity, retrieving information about the person from a person information database; and displaying the retrieved information in an overlay with a facial image of the person to a user. menu items can also be displayed. The identifying feature may be a biometric or a non-biometric feature.

20 Claims, 7 Drawing Sheets

View Calendar

Email Agent

Schedule 1-on-1

SYSTEMS AND METHODS FOR RETRIEVING AND PRESENTING INFORMATION USING AUGMENTED REALITY

FIELD OF THE INVENTION

The present invention relates generally to retrieving information related to a person such as an agent and presenting the information using augmented reality (AR) following a happenstance encounter with the agent, for use for example in workplaces, such contact centers.

BACKGROUND

A key responsibility for management in organizations for example in contact centers is to coach members of their team to improve performance. Within contact centers, this coaching is often conducted between workforce management (WFM) supervisors and contact center agents (people), and focuses on various topics that contribute to team performance metrics. However, it is not uncommon for WFM supervisors to focus primarily on those agents who are underperforming or top performing. Thus, the agents with performance in the middle (e.g. 60-80% of agents) typically receive the least if any coaching focus.

Prior art solutions are typically limited to a specific method for analyzing interactions and providing coaching sessions. The prior art does not provide a mechanism for scheduling coaching sessions, except for either scheduling periodic coaching sessions or scheduling coaching sessions for underperforming agents, which only contributes to the above described problem.

SUMMARY

According to embodiment of the invention, a system and method for recognizing a person may include: a person information database; a first processor; and a mobile device including a second processor configured to: capture an identifying feature of the person; and send the identifying feature to the first processor. The first processor may be configured to: obtain the identifying feature; identify the person based on the identifying feature to return a person identity; using the person identity, retrieve information about the person from the person information database; and send the retrieved information to the second processor. The second processor may be configured to: obtain the retrieved information from the first processor; and display the retrieved information in an overlay with a facial image of the person to a user.

According to embodiments of the invention, the second processor may be configured to display menu items together with the facial image of the person to a user.

According to embodiments of the invention, the second processor may be configured to display the retrieved information and the menu items in an overlay on the facial image of the person on a screen of the mobile device.

According to embodiments of the invention, the identifying feature may be a biometric feature of the person, and the first processor may be configured to: generate a feature vector descriptive of the biometric feature; and identify the person based on the identifying feature by searching in a database associating feature vectors of persons to persons' identity for a matching feature vector.

According to embodiments of the invention, the identifying feature may be a facial image of the person, the mobile device may include a camera configured to capture the facial image, and the first processor may be configured to: generate a feature vector descriptive of the facial image; and identify the person based on the identifying feature by searching in a database associating feature vectors of persons to persons' identity for a matching feature vector.

According to embodiments of the invention, the first processor may be configured to identify the person based on the facial image by: comparing the feature vector with a plurality of stored feature vectors, each of the stored feature vectors of the plurality of stored feature vectors is associated with a person; and selecting a person with a stored feature vector that is closest to the calculated feature vector among the plurality of stored feature vectors.

According to embodiments of the invention, the retrieved information may include performance metrics of the person.

According to embodiments of the invention, the retrieved information may include schedule information of the person.

According to embodiments of the invention, the second processor may be configured to schedule a meeting with the person based on the schedule information.

According to embodiments of the invention, the identifying feature may be a barcode of (e.g. identifying) the person, the mobile device may include a camera configured to capture the barcode, and the first processor may be configured to identify the person based on the barcode by searching in a database associating barcodes of (e.g. identifying) persons to information about the persons for a matching barcode.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
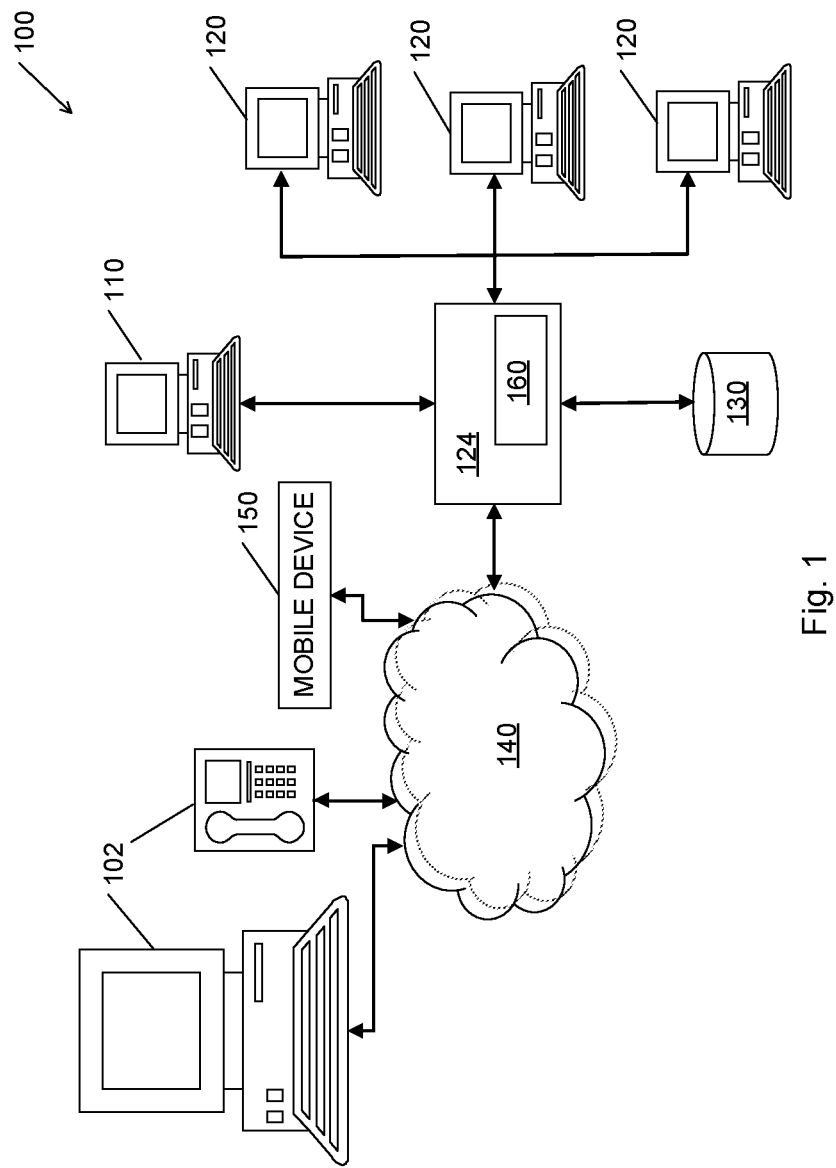
FIG. 1 schematically illustrates a system, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Contact centers may include many agents or other people or personnel available to participate in contacts with customers. A contact may be, for example, a conversation or interaction between an agent and a customer. The contact center may house many more agents than supervisors. For example, in many contact centers a single supervisor may be responsible for a team of up to 25 agents or more. In addition, turnover in contact centers may be high, e.g., between 30-45 percent (e.g., 30-45% of agents change within one year), so there may be a constant flow of new faces that a supervisor needs to become familiar with. Thus, for example, it may be difficult for supervisors to efficiently identify the agents that may benefit from supervisor attention from among all of the agents in the contact center. That is, problems may arise in contact centers and other situations where a relatively large number of workers or other people are being supervised by a relatively small number of supervisors. The supervisors may find it difficult to effectively monitor every agent often enough. Although a contact center may staff more supervisors to catch more situations where supervisor attention may be beneficial, doing so may be relatively costly. For example, staffing more supervisors may increase the costs of operating the contact center, including supervisor salary costs and supervisor workspace costs, without a fully offsetting increase in revenue. While embodiments of the invention are described herein with relation to agents in a contact center, embodiments of the invention may be useful for computer systems in other organizations with supervisors and workers or agents (the terms agents and workers will be used interchangeably herein).

Embodiment of the invention may provide a system and method for retrieving and presenting information and scheduling meetings, e.g., coaching sessions, following happenstance encounters with agents. Supervisors may have happenstance encounters with agents in a variety of settings such as coffee breaks, passing by on the way to a meeting, in an elevator, etc. These happenstance encounters could be an opportune time to either have an impromptu coaching session or set an immediate meeting, a coaching session etc. Currently, supervisors typically lack sufficient individual performance information on the agent to have a meaningful impromptu session. In the event of scheduling for a near-future session, the supervisor typically does not have access to his or the agent's schedule and therefore must typically return to his workstation to set the meeting. Thus, the supervisor typically relies on a mental or hastily written notes. These notes often become discarded or un-actioned once the supervisor returns to his or her workstation and urgent matters absorb their attention. Thus, using prior art systems this becomes a lost opportunity for a supervisor to engage in a meaningful conversation with a member of the WFM team.

Embodiments of the invention may provide computing systems providing supervisors a method for retrieving information about an agent in a happenstance encounter, including capturing an identifying feature of the agent using a mobile device (e.g. smartphone, portable computer, etc.), and identifying the agent (e.g. a person) based on the identifying feature by searching a database of agent identifying features for the agent identity. Once the agent identity is known, the agent identity may be used to retrieve information about the agent from an agent information database. The retrieved information may be displayed alongside menu items together or in an overlay with a facial image of the agent, e.g. the retrieved information and facial or other image may be displayed together such that features from both can be seen together, on the mobile device of the supervisor. The identifying feature may include any biometric or non-biometric feature unique to the agent that may be captured or received by the mobile device and used for identifying the agent. For example, the identifying feature may include a biometric feature such as an image, a voice recording, a fingerprint, etc. of the agent, or a non-biometric feature such as a barcode including a quick response (QR) code, located for example on a badge or an employee card of the agent.

The identifying feature may be captured or received by a mobile device of the supervisor. If the identifying feature is a biometric feature a signature or a feature vector may be generated based on the identifying feature. For example, if the identifying feature is a facial image of the agent, the signature may include a feature vector descriptive of the facial image, if the identifying feature is a voice recording of the agent, the signature may include a feature vector or voiceprint descriptive of the voice recording, etc.

The identifying feature or signature (e.g. generated based on the identifying feature) may be used to identify the identity (e.g. name, employee identification number, etc.) of the agent, e.g., by searching a database of agent identifying features. The database of identifying features may include a record for each agent, the record associating the identifying feature or signatures with specific agents. For example, in the case where the identifying feature is a facial image of the agent captured using a camera of a mobile device, a feature vector descriptive of the facial image may be generated for the facial image, and the database of agent identifying features may include records associating feature vectors of agents to agents identity, e.g., to agents' identity numbers (ID). If the identifying feature is a voice recording of the agent captured using a recorder of a mobile device, a feature vector including a voiceprint descriptive of the voice recording may be generated for the voice recording and the database of agent identifying features may include records associating feature vectors (including a voiceprints) of agents to agents identity.

According to some embodiments, after identifying the agent, an agent information database may be searched for information about the agent. The information may be retrieved from the agent information database and presented to the supervisor together with a facial image of the agent. The retrieved information and the menu items may be presented near or in an overlay on a facial image of the agent and displayed on a screen, display or monitor of the mobile device.

The facial image of the agent may be a facial image of the agent captured by the supervisor during the happenstance encounter, or an image of the agent retrieved from a database (e.g., the agent or person information database) based on the agent identity. The retrieved information may include performance metrics of the agent that may assist the supervisor to conduct a meaningful impromptu session or to decide whether a training session should be scheduled. The retrieved information may include schedule information of the agent that may assist the supervisor to set a training session with the agent. Menu items (e.g., for scheduling a training session) may be presented as well.

Embodiments of the invention may extend the usefulness of a supervisor's mobile device with a new benefit of assisting in retrieving required information and scheduling meetings on the fly, in a happenstance encounter, without preplanning and preparation on the supervisor side. Thus, a supervisor time may be used in a more efficient manner. Embodiments of the invention may provide technological infrastructure for efficiently providing information when needed, that is much more accurate over cognitive capabilities of humans, especially in situation of very few supervisors responsible for a much larger number of agents.

Embodiments of the invention may provide a mobile application that uses AR and biometric identification (e.g., image recognition) or barcode scan to overlay a simple user interface (UI) on a supervisor's mobile device or tablet. Additionally, useful information, including for example performance metrics and statistics of the agent such as average handle time, adherence level, or other performance metrics may be fetched and included on the UI. The application may further provide integration with calendar functionality to provide a preformatted calendar invite between the agent and supervisor to schedule a coaching session.

Thus, using embodiments of the invention, a supervisor may be able to either have an impromptu meaningful conversation or efficiently schedule a coaching session on the go. In instances where a coaching session is to be scheduled, the calendar invite message default may automatically populate the invitee list with the agent, subject line, and preformatted message. This reduces cognitive and task workload on the supervisors where they encounter agents away from the workstation, e.g. in a breakroom, elevator, etc. In either an impromptu conversation or scheduling a coaching session, the result may be that a supervisor has necessary information regarding an agent's specific statistics while away from the workstation and can maximize interactions. Call center efficiency may increase by enabling a supervisor to supervise a large number of agents more effectively, thereby reducing the number of supervisors needed, and thus reducing cost.

Although described in the context of a contact center, the same or a similar augmented reality system may be employed in other contexts where supervision of large numbers of people may be beneficial. For example, augmented reality systems may be employed on a stock exchange floor, at a convention, at a sporting event, or the like. Embodiments of the present invention may prove especially useful in hospital or other urgent-response environments, where one person needs to respond swiftly and accurately to a change in the situation or environment.

Reference will be made to the figures wherein like structures will be provided with like reference designations. The drawings are non-limiting, diagrammatic, and schematic representations of example embodiments, and are not necessarily drawn to scale.

Reference is made to FIG. 1, which schematically illustrates a system 100, according to embodiments of the invention. System 100 may include contact center 124 which may connect customer devices 102 to agent devices 120. Contact center 124 may also be connected to supervisor device 110. Contact center 124 may be or may include company call centers for telephone-based support, or online support forums for voice over internet protocol (VoIP) Internet-based support, for example, to provide customers with technical support, sell products, schedule appointments, or otherwise interact or communicate with customers. Organizations other than a contact center may use embodiments of the invention. Contact center 124 may include a switching station to connect each of a plurality of user devices 102 to one of a plurality of agent devices 120 at the same time. Contact center 124 may include WFM module 160 configured to identify and agent and provide agent information as disclosed herein. Contact center 124 may be connected to one or more databases 130 for storing interactions or calls (e.g. conversations via telephone, VoIP, etc.) between users and agents via user devices 102 and agent's devices 120, and other data such as agents signatures and feature vectors, agents information including performance metrices and statistics, agents schedules, and any other relevant data.

System 100 may be connected, or configured to be connected, to one or more user devices 102, such as, computers (for web or Internet voice connections), telephones (for telephone or radio network connections), for a customer to interact with and communicate with agents over one or more networks 140. Networks 140 may include any type of network or combination of networks available for supporting communication between user devices 102, supervisor device 110, contact center 124, agent devices 120, mobile device 150 and databases 130. Networks 140 may include for example, wired and wireless telephone networks, the Internet and intranet networks, etc. Customers may use user devices 102 to connect to and communicate with live agents, for example, using or operating on agent devices 120 at contact center 124. System 100 may be connected, or configured to be connected, to one or more supervisor devices 102, such as, a computer for supervising agents.

System 100 may include a supervisor mobile device 150, that may have access to WFM module 160 via network 140. Mobile device 150 may be or may include a handheld device, a smartphone, a tablet, etc. Mobile device 150 may be configured to capture an identifying feature of an agent, send the captured identifying feature over to WFM module 160, obtain agent information from WFM module 160 and display the retrieved information and optional menu items in an overlay on a facial image of the agent.

Figure 7:
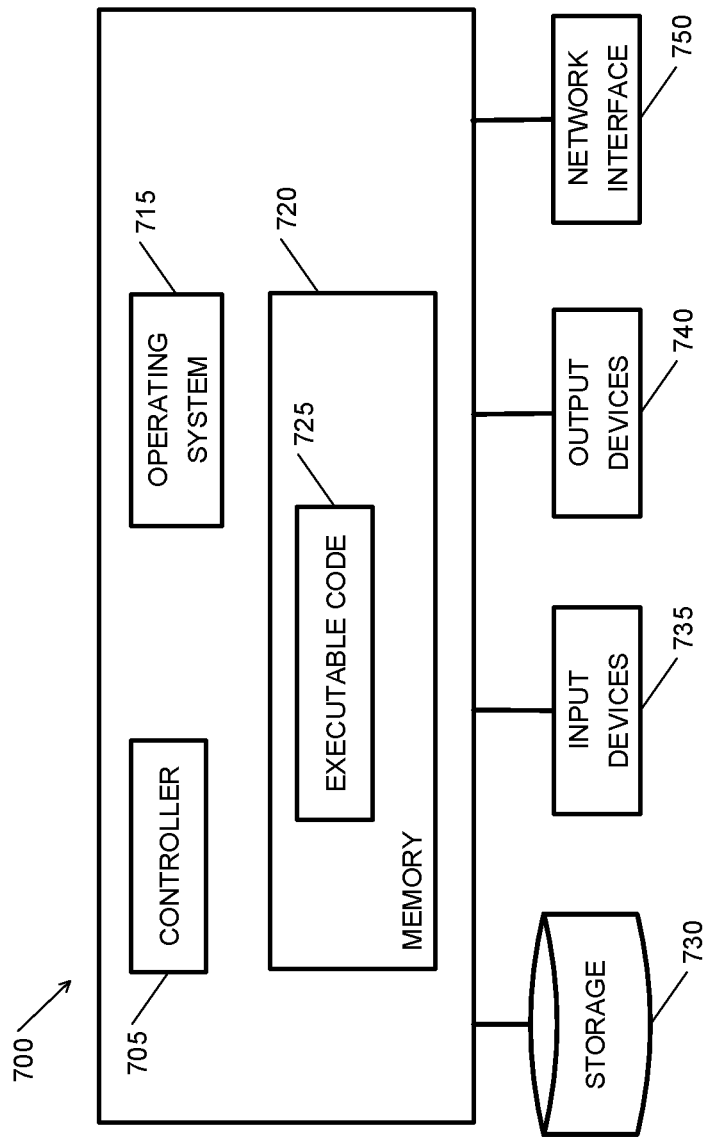
FIG. 7 illustrates an example computing device according to an embodiment of the invention.

Each of user devices 102, supervisor device 110, contact center 124, mobile device 160 and agent devices 120 may be or may include a computing device such as computing device 700 depicted in FIG. 7. Database 130 may be or may include a storage device such as storage device 730.

WFM module 160 may be configured to obtain or receive the identifying feature of the agent from mobile device 150 identify the agent based on the identifying feature, retrieve information about the agent using the agent identity, and send or transmit the retrieved information back to mobile device 150.

Figure 2:
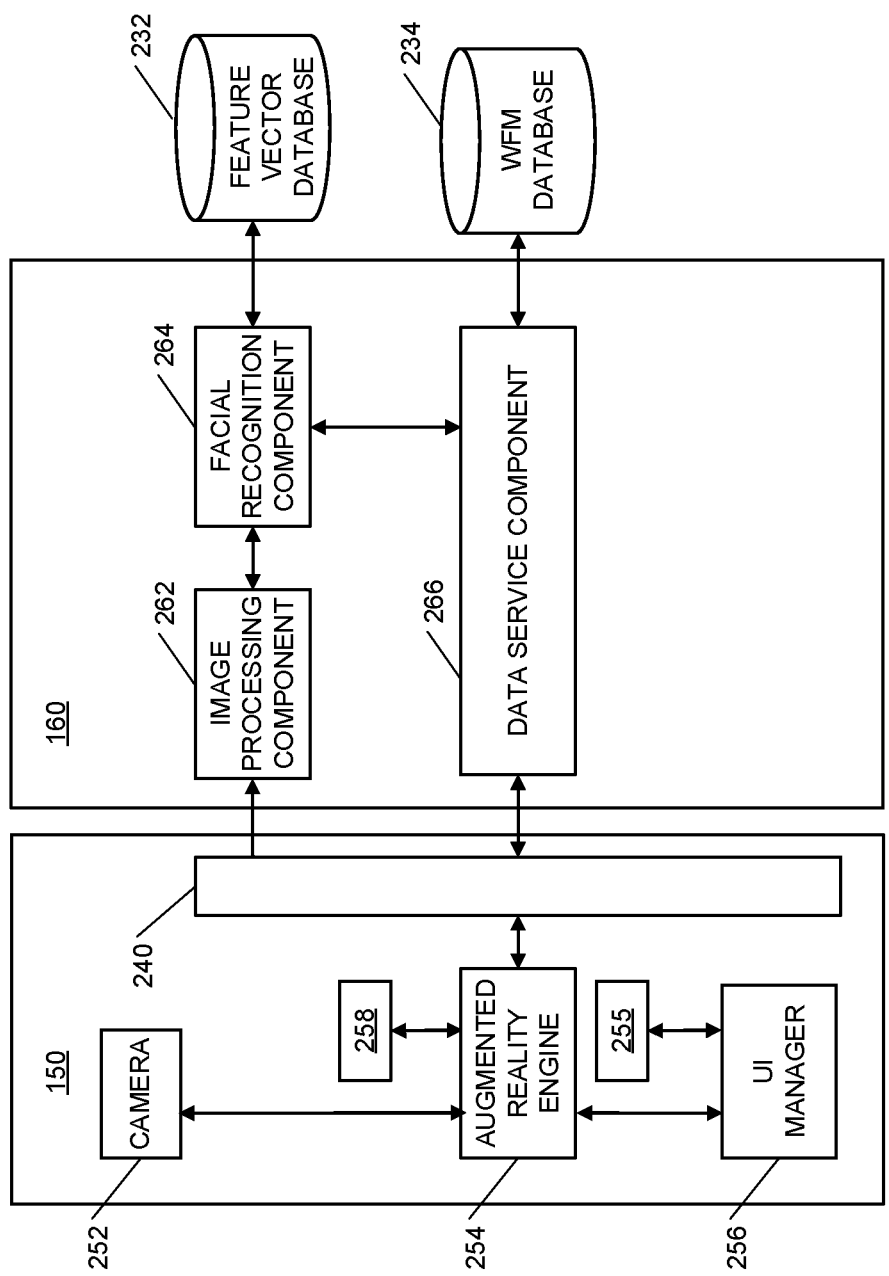
FIG. 2 schematically illustrates a system for retrieving information related to an agent and presenting the information using AR following a happenstance encounter with the agent, according to embodiments of the invention.

Reference is made to FIG. 2, which schematically illustrates a system 200 for retrieving information related to an agent and presenting the information using AR following a happenstance encounter with the agent, according to embodiments of the invention. System 200 may include components of system 100 depicted in FIG. 1. Similar components are provided with like reference designations. I Mobile device 150 may be configured to capture an identifying feature of an agent. For example, in some embodiments mobile device 150 may include a camera 252 and may be configured to capture an image of the agent, a fingerprint of an agent or a barcode such as a QR code of or identifying the agent. For example, when an augmented reality application is open camera 252 may be used to scan an agent's face, fingerprint or barcode. For example, camera 252 may be or may include an inbuilt camera of mobile device 150. The captured image may be provided to an AR engine 254. In some embodiments mobile device 150 may include a recorder 258 and may be configured to capture a voice recording of the agent. The voice recording may be provided to AR engine 254.

AR engine 254 may be or may include a software platform (e.g. executed by a processor as in FIG. 7) that may provide an AR experience. AR engine 254 may receive the identifying feature, e.g., the device's camera feed (e.g., images taken by camera 252) or an audio recording e.g., recorded by recorder 258). In case a facial image of the agent is used as an identifying feature of the agent, AR engine 254 may perform a scan of the camera feed or video stream, or images taken by the supervisor, to detect a face-like structure. If AR engine 254 finds a face-like structure, AR engine 254 may capture one or more images with the face-like structure and forward the captured images to WFM module 160 via web interface 240. In case a fingerprint of the agent is used as an identifying feature of the agent, AR engine 254 may perform a scan of the camera feed to detect a fingerprint-like structure. If AR engine 254 finds a fingerprint-like structure, AR engine 254 may capture one or more images with the fingerprint-like structure and forward the one or more images to WFM module 160 via web interface 240. In case a barcode (e.g., a QR code) of (e.g. identifying) the agent is used as an identifying feature of the agent, AR engine 254 may perform a scan of the camera feed to detect a barcode-like structure. If AR engine 254 finds a barcode-like structure, AR engine 254 may capture one or more images with the barcode-like structure and forward the captured images or barcodes to WFM module 160 via web interface 240. In case a voice recording of the agent is used as an identifying feature of the agent AR engine 254 may perform a scan to detect a voice recording in the audio recording. If AR engine 254 finds a voice-like structure, AR engine 254 may capture the audio recording including the voiced samples and forward the audio recording to WFM module 160 via web interface 240.

AR engine 254 may obtain agent information from WFM module 160 via web interface 240. The agent information may include agent performance metrices and statistics, as well as the agent schedule and any other relevant information. For example, if an image of the agent is not captured by camera 252, an image of the agent may be included in the agent information. AR engine 254 may provide the agent information to user interface (UI) manager 256. AR engine 254 may also coordinate with the UI manager 256 and provide AR capability to UI manager 256 to be able to display the agent information as an augmented interface on top of the live camera feed, the captured image of the agent or an image of the agent obtained from WFM module 160.

Mobile device 150 may include a display 255 and may be configured to display the retrieved information and optional menu items in an overlay on a facial image of the agent. UI manager 256 may control the content displayed on display 255 by the AR application, e.g., an overlay of the facial image of the agent and the retrieved information and menu items. UI manager 256 may provide the capability to the supervisor to customize the user interface displayed on display 255. UI manager 256 may superimpose, display over, or overlay the user interface on top of a camera image or feed, or another image of the agent using AR engine 254. UI manager 256 may provide options to the supervisor to select what types of information they would like to see for the agent detected. Any user interface displayed on screen or display 255 by the AR application may be configured and assembled by UI manager 256.

Web interface 240 may include a standard representational state transfer (REST) based web interface (or other network interface) which adds coordination between the frontend of the application, e.g., the part of the application running on mobile device 150, including for example AR engine 254, and the backend of the AR application, e.g., the part of the application running on WFM module 160. Web interface 240 may coordinate the communication between AR engine 254 and WFM module 160, e.g., sending the identifying feature from AR engine 254 to WFM module 160 and receiving the agent information from WFM module 160.

WFM module 160 may include an image processing component 262, a facial recognition component 264 and a data service component 266. Image processing component 262 may accept the identifying feature from AR engine 254 and may perform preprocessing on the identifying feature if necessary. For example, in case a facial image of the agent is used as an identifying feature of the agent, image processing component 262 may obtain the facial image of the agent and may perform the preprocessing on the image to calculate or generate a feature vector descriptive of the facial image. Similarly, in case a fingerprint of the agent is used as an identifying feature of the agent, image processing component 262 may obtain the fingerprint image of the agent and may perform the preprocessing on the image to calculate or generate a feature vector descriptive of the fingerprint. In case a voice recording of the agent is used as an identifying feature of the agent, image processing component 262 may obtain the voice recording of the agent and may perform the preprocessing on the voice recording to calculate or generate a feature vector including a voiceprint descriptive of the voice recording. The feature vector may be generated in a predefined format to make the feature vector compatible with the format of the feature vectors stored in employee feature vector database 232 (which may be a person identification database). The feature vector of the image and/or the voice recording may be sent to agent recognition component 264.

Agent recognition component 264 may obtain or receive the feature vector as an input and determine whether or not the feature vector corresponds to or matches a feature vector of an agent stored in employee feature vector database 232. Agent recognition component 264 may scan employee feature vector database 232 for the feature vector, and if found, agent recognition component 264 may fetch or retrieve the corresponding agent ID from employee feature vector database 232 and may forward the agent ID to data service component 266. If a barcode (e.g., in the form of a QR code or other code) is used as an identifying feature, the barcode itself may be the agent ID, or an agent ID may be associated with the barcode, for example, in feature vector database 232.

Data service component 266 may interact with agent recognition component 264 and WFM database 234 to fetch or retrieve information related to an agent's performance based on the agent ID. Data service component 266 may obtain or receive the agent ID from agent recognition component 264 and may search WFM database 234 for information associated with this agent ID. Data service component 266 may also fetch or retrieve schedule information of the agent from WFM database 234. When the supervisor initiates scheduling a one-on-one session or any other coaching session with the agent, interface data service component 266 may process the request, send appropriate invites and save the request in WFM database 234.

Employee feature vector database 232 may hold or store the feature vectors of all agents of contact center 124 and their corresponding agent ID. Employee feature vector database 232 may include a plurality or records, each associating a feature vector of an agent to the agents ID. Data in employee feature vector database 232 may be populated separately, for example a record of an agent may be added to employee feature vector database 232 when an agent is registered in contact center 124.

WFM database 234, also referred to herein as agent information database, may be a standard on-prem (e.g. on premises) or cloud database which contains all the information about the contact center's WFM related operations. Specifically, WFM database 234 may store agent information, including agent performance metrices and statistics, agent schedules, etc. The agent information may be stored by and retrieved using the agent ID.

Figure 3:
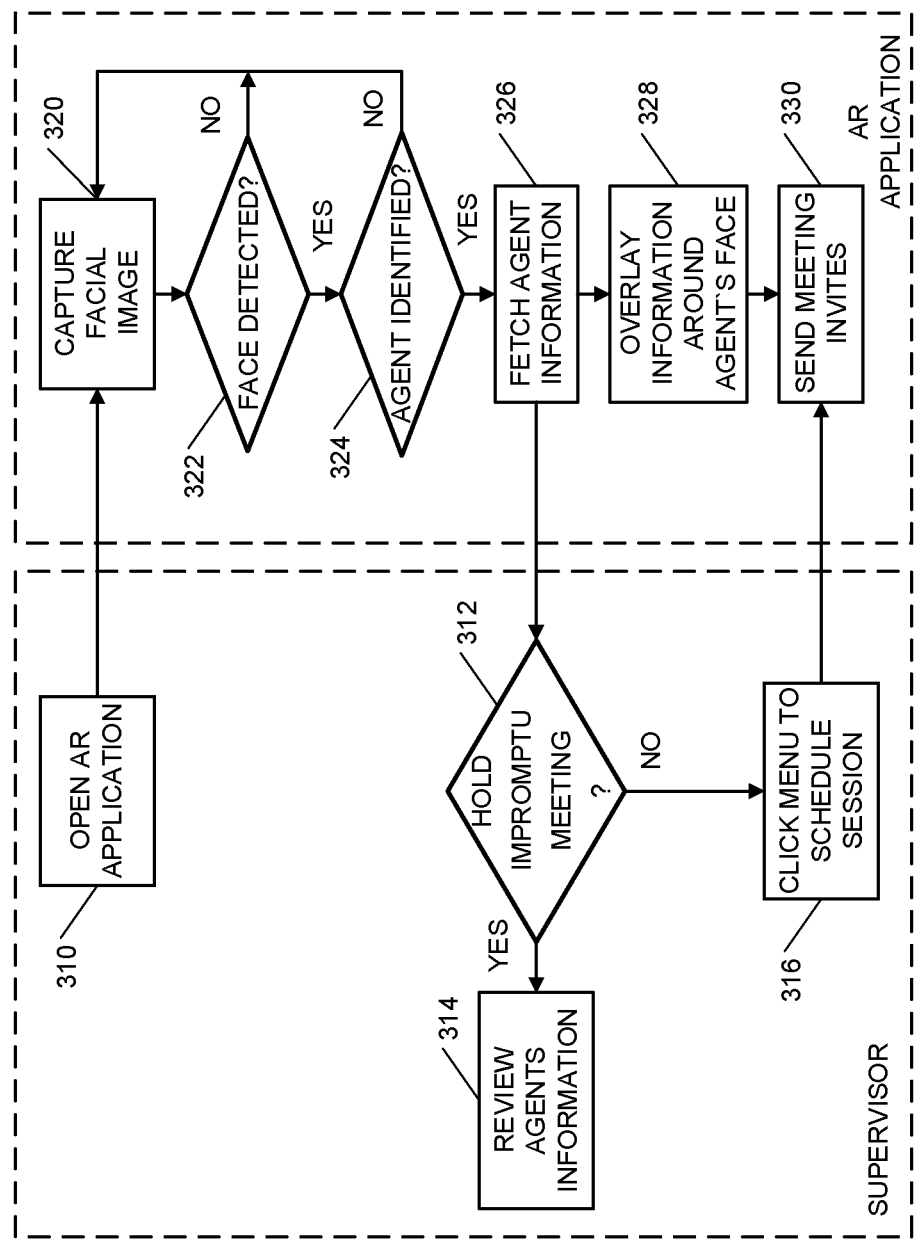
FIG. 3 is a flowchart of a method for retrieving agent information based on a facial image of the agent, according to embodiments of the invention.

Reference is made to FIG. 3, which is a flowchart of a method for retrieving agent information based on a facial image of the agent, according to embodiments of the invention. An embodiment of a method for retrieving agent information based on a facial image of the agent may be performed, for example, by the systems shown in in FIGS. 1 and 2, but other hardware may be used. In FIG. 3, operations that are performed by the supervisor are presented on the left side and operations that are performed by the system are presented on the right side.

In operation 310 the supervisor may open the AR application on his mobile device and point the camera at an agent's face. In operation 320 the AR application may use the device camera to take or capture an image of the agent's face. If no face is detected in operation 322, the AR application may keep scanning the camera feed or may wait for the supervisor to take an image of the agent's face. If a face is detected in operation 322, then in operation 324 a facial recognition algorithm may be used and the agent may be identified, e.g., by generating a feature vector for the facial image and searching for a matching feature vector in an agents feature vector database (e.g., employee feature vector database 232), to return an agent identity (e.g., name or ID number). If a matching feature vector is found, the agent may be identified and in operation 326 agent information may be fetched or retrieved from an agent information database (e.g., WFM database 234). In operation 328, the fetched or retrieved information may be presented on the user interface together with or in an overlay with the facial image of the agent. In operation 314, the supervisor may review the agent's information, including the agent's performance metrices and statistics presented on a monitor or screen. Thus, if the supervisor wants, then in operation 312 the supervisor may have an impromptu, on the spot, discussion with the agent, informed by information viewed in operation 314. Additionally or alternatively, in operation 316, the supervisor may schedule a one-on-one session, or other training session with the agent, by clicking on a menu item to initiate the session scheduling process. After filling out the scheduling form, the supervisor may submit a session request. In operation 330 the session request may be analyzed, and appropriate invites may be sent to the agent and supervisor.

Figure 4:
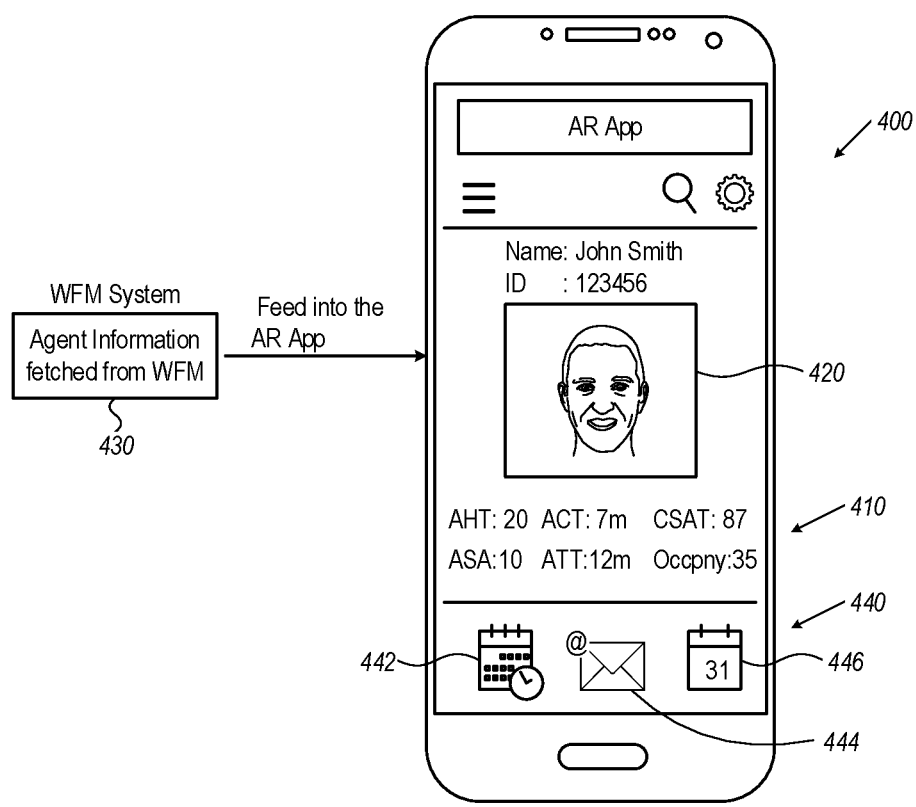
FIG. 4 shows an overlay of agent information over an agent image, according to embodiments of the invention.

Reference is now made to FIG. 4, which shows an overlay 400 of agent information 410 over agent image 420, according to embodiments of the invention. Overlay 400 may be displayed on display 255 of mobile device 250. Agent Information 430 that was fetched or retrieved from WFM module 160 including performance metrics and daily schedule information 410 of the agent may be fed into the AR application and presented in an overlay with the facial image 420 of the agent. The facial image 420 may include a live stream from camera 252 of the supervisor mobile device 250, a facial image of the agent captured by camera 252, or an image of the agent retrieved as part of agent information 410. Overlay 400 may include menu items 440. Menu items 440 may include icons for activating various actions such as:

Schedule a one-on-one session 442: used to schedule a meeting or coaching session with the agent and the supervisor.

Email agent 444: used to email or otherwise send a meeting or coaching session invite to the agent.

View calendar 446: used to view agent's calendar for scheduling the meeting or coaching session.

Other menu items and operations may be used.

Figure 5C:
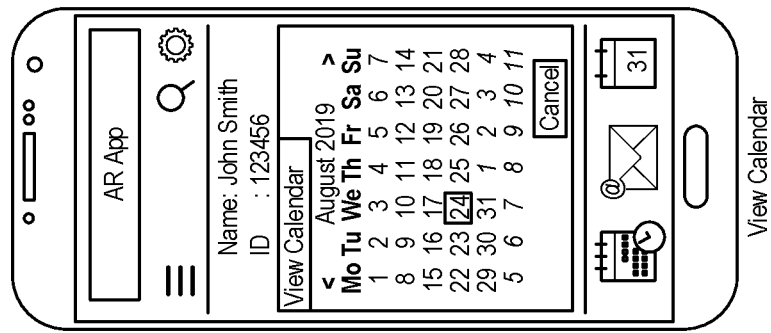
FIG. 5C shows a screen shot of a display after selecting a view calendar menu item, according to embodiments of the invention.
Figure 5B:
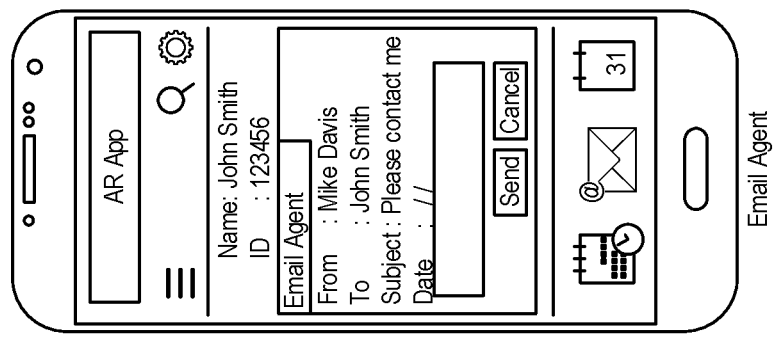
FIG. 5B shows a screen shot of a display after selecting an email agent menu item, according to embodiments of the invention.
Figure 5A:
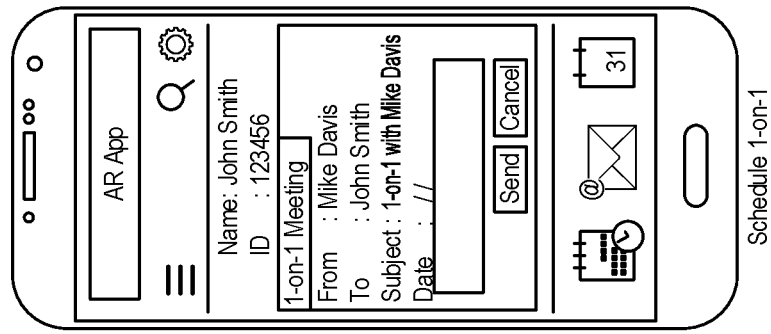
FIG. 5A shows a screen shot of a display presented after selecting a one-on-one session menu item, according to embodiments of the invention.

Reference is now made to FIGS. 5A-5C, which show exemplary screen (e.g. monitor) shots of display 255 after selecting menu items 442-446, respectively, according to embodiments of the invention. FIG. 5A shows a screen shot of display 255 presented after selecting one-on-one session 442 menu item. Upon the selection or click of schedule a one-on-one session 442 icon, a popup screen may appear with the details of scheduling a meeting with the agent as shown in FIG. 5A. FIG. 5B shows a screen shot of display 255 presented after selecting email agent 444 menu item. On or in response to the click of email agent 444 icon, a popup screen may appear with the details of sending an e-mail message to the agent as shown in FIG. 5B. FIG. 5C shows a screen shot of display 255 after selecting view calendar 446 menu item. Upon a selection or click of view calendar 446 icon, a popup screen may appear with the details of details of current agent schedule calendar as shown in FIG. 5C.

Figure 6:
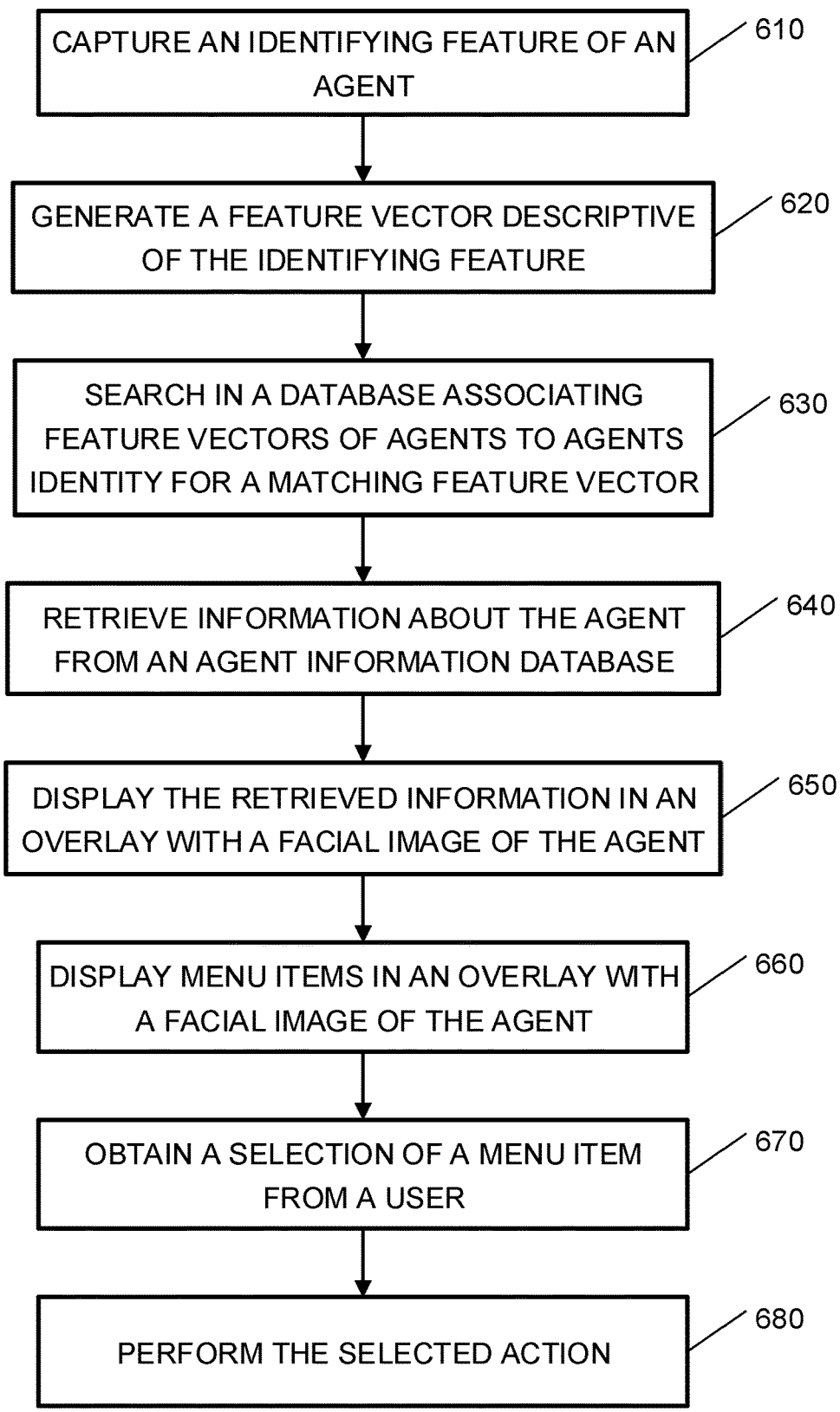
FIG. 6 is a flowchart of a method for recognizing an agent including retrieving information related to an agent and presenting the information using AR following a happenstance encounter with the agent, according to embodiments of the present invention.

Reference is now made to FIG. 6 which is a flowchart of a method for recognizing an agent including retrieving information related to an agent and presenting the information using AR following a happenstance encounter with the agent, according to embodiments of the present invention. An embodiment of retrieving information related to an agent and presenting the information using AR following a happenstance encounter with the agent may be performed, for example, by system 100 presented in FIG. 1, but other hardware may be used.

In operation 610 an identifying feature of an agent may be received or captured. The identifying feature may include a biometric feature such as an image of the agent, a voice recording, a fingerprint, etc., or a non-biometric feature such as a barcode or a QR code, located for example on a badge or an employee card of the agent. The identifying feature may be unique to the agent and may be captured by a mobile device and used for identifying the agent.

In operations 620 and 630 the agent may be identified based on the identifying feature to return an agent identity (e.g., an agent name or ID). For example, in operation 620, a feature vector descriptive of the biometric feature may be generated. In operation 630 a database (e.g., feature vector database 232 shown in FIG. 2) associating feature vectors of agents to agents' identity may be searched for a matching feature vector. If a record or entry with a matching feature vector is found, the agent identity (e.g., an agent name or ID) associated with the matching feature vector is retrieved or fetched. Operation 630 may include comparing the feature vector with a plurality of stored feature vectors (each associated with an agent) and selecting an agent with a stored feature vector that is closest to the calculated feature vector among the plurality of stored feature vectors.

In case a barcode is used, the barcode itself may be or may directly translate to the agent ID, or an agent ID may be associated with the barcode, for example, in a look up table (LUT) or in feature vector database 232. Thus, the feature vector database 232 may be searched for a matching barcode and the agent ID may be retrieved or fetched.

In operation 640, information about the agent may be retrieved or fetched from an agent information database (e.g., WFM database 234) using the agent identity. The retrieved information may include performance metrics and statistics of the agent that may assist the supervisor to conduct a impromptu session with the agent or to decide whether a training session should be scheduled. The retrieved information may include schedule information of the agent that may assist the supervisor to set a training session with the agent.

In operation 650 the retrieved information may be presented or displayed to the supervisor, for example, in an overlay with, next to, or together with a facial image of the agent to a user, e.g., on a display or screen of a mobile device of the supervisor (e.g., display 255 of mobile device 150). The facial image of the agent may be a part of a live stream captured by the camera of the mobile device, a facial image of the agent captured by the supervisor during the happenstance encounter, or an image of the agent retrieved form a database (e.g., the agent information database) based on the agent identity. In operation 660 menu items (e.g., for scheduling a training session) may also be presented in an overlay with, next to, or together with the facial image of the agent.

In operation 670, a selection of a menu item may be obtained received or from the supervisor. For example, the supervisor may touch or otherwise select one of icons 442-446 presented on display 255. In response to the supervisor selection, an action may be performed. For example, if the supervisor selects one-on-one session 442 menu item, a display similar to the screenshot sown in FIG. 5A may be presented to the supervisor and a meeting with the agent may be scheduled based on the schedule information. If the supervisor selects email agent 444 menu item, a display similar to the screenshot sown in FIG. 5B may be presented to the supervisor assisting the supervisor to send an email to the agent. If the supervisor selects view calendar 446 menu item, a display similar to the screenshot sown in FIG. 5C may be presented to the supervisor.

FIG. 7 illustrates an example computing device according to an embodiment of the invention. Various components such as mobile device 136, supervisor devices 110, agent devices 120, mobile device 150 contact center 124 and other modules, may be or include computing device 700, or may include components such as shown in FIG. 7. For example, a first device with a first processor may be used to identify a person and a second device using a second processor may be configured to schedule a meeting with the identified person.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer located at a workplace or call center, or may be at least partially implemented by a remote server (e.g., in the "cloud"), or may be a mobile device such as a smartphone or tablet etc.

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include an application to gather agent information and display the information in an overlay with a facial image of the agent. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB)

device or other suitable removable and/or fixed storage unit. In some embodiments, some of the components shown in FIG. 7 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a WiFi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

Computer database, systems integration, and scheduling technology may be improved by shortening the time taken to identify a person, retrieve records related to the person, and schedule a meeting with the person.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for recognizing a person, the method comprising:
   capturing an identifying feature of the person;
   identifying the person based on the identifying feature to return a person identity;
   using the person identity, retrieving information about the person from a person information database, wherein the retrieved information comprises work performance metrics of the person and future schedule information of the person;
   offering a meeting schedule with the person based on the future schedule information; and
   displaying the retrieved information in an overlay with a facial image of the person to a user.

2. The method of claim 1, comprising displaying menu items together with the facial image of the person to a user.

3. The method of claim 2, wherein the retrieved information and the menu items are displayed in an overlay on the facial image of the person on a screen of the mobile device.

4. The method of claim 1, wherein the identifying feature is a biometric feature of the person captured using a mobile device, wherein the method comprises generating a feature vector descriptive of the biometric feature, wherein identifying the person based on the identifying feature comprises searching in a database associating feature vectors of persons to persons' identity for a matching feature vector.

5. The method of claim 1, wherein the identifying feature is a facial image of the person captured using a camera of a mobile device, the method comprising generating a feature vector descriptive of the facial image, wherein identifying the person based on the identifying feature comprises searching in a database associating feature vectors of persons to persons' identity for a matching feature vector.

6. The method of claim 5, wherein identifying the person based on the facial image comprises:
    comparing the feature vector with a plurality of stored feature vectors, each of the stored feature vectors of the plurality of stored feature vectors is associated with a person; and
    selecting a person with a stored feature vector that is closest to the calculated feature vector among the plurality of stored feature vectors.

7. The method of claim 1, wherein the identifying feature is a barcode of the person captured using a camera of a mobile device.

8. The method of claim 1, wherein the work performance metrics are contact center agent work performance metrics.

9. The method of claim 1, wherein the future schedule information describes a meeting between an agent and a supervisor in a contact center.

10. The method of claim 1, wherein offering a meeting schedule with the person comprises using a scheduling application to submit a session request, and upon receiving the session request, setting the meeting.

11. A system for recognizing a person, the system comprising:
    a person information database;
    a first processor; and
    a mobile device comprising a second processor configured to:
        capture an identifying feature of the person; and
        send the identifying feature to the first processor;
    wherein the first processor is configured to:
        obtain the identifying feature;
        identify the person based on the identifying feature to return a person identity;
        using the person identity, retrieve information about the person from the person information database, wherein the retrieved information comprises work performance metrics of the person and future schedule information of the person;
        offer a meeting schedule with the person based on the future schedule information; and
        send the retrieved information to the second processor;
    wherein the second processor is further configured to:
        obtain the retrieved information from the first processor; and
        display the retrieved information in an overlay with a facial image of the person to a user.

12. The system of claim 11, wherein the second processor is further configured to display menu items together with the facial image of the person to a user.

13. The system of claim 12, wherein the second processor is further configured to display the retrieved information and the menu items in an overlay on the facial image of the person on a screen of the mobile device.

14. The system of claim 11, wherein the identifying feature is a biometric feature of the person, and wherein the first processor is configured to:
    generate a feature vector descriptive of the biometric feature; and
    identify the person based on the identifying feature by searching in a database associating feature vectors of persons to persons' identity for a matching feature vector.

15. The system of claim 11, wherein the identifying feature is a facial image of the person, wherein the mobile device comprises a camera configured to capture the facial image, and wherein the first processor is further configured to:
    generate a feature vector descriptive of the facial image; and
    identify the person based on the identifying feature by searching in a database associating feature vectors of persons to persons' identity for a matching feature vector.

16. The system of claim 15, wherein the first processor is configured to identify the person based on the facial image by:
    comparing the feature vector with a plurality of stored feature vectors, each of the stored feature vectors of the plurality of stored feature vectors is associated with a person; and
    selecting a person with a stored feature vector that is closest to the calculated feature vector among the plurality of stored feature vectors.

17. The system of claim 11, wherein the identifying feature is a barcode of the person, wherein the mobile device comprises a camera configured to capture the barcode, wherein the person information database associates barcodes of persons to information about the persons.

18. The system of claim 11, wherein the work performance metrics are contact center agent work performance metrics.

19. The system of claim 11, wherein the future schedule information describes a meeting between an agent and a supervisor in a contact center.

20. The system of claim 11, wherein offering a meeting schedule with the person comprises using a scheduling application to submit a session request, and upon receiving the session request, setting the meeting.

* * * * *